United States Patent
You et al.

(10) Patent No.: US 8,441,724 B2
(45) Date of Patent: May 14, 2013

(54) IR FILTERS WITH HIGH VLT AND NEUTRAL COLOR

(75) Inventors: Xiaorong You, Shrewsbury, MA (US); Phil Johnson, Charlton, MA (US)

(73) Assignee: Sperian Eye & Face Protection, Inc., Smithfield, RI (US)

( * ) Notice: Subject to any disclaimer, the term of this patent is extended or adjusted under 35 U.S.C. 154(b) by 466 days.

(21) Appl. No.: 12/832,284

(22) Filed: Jul. 8, 2010

(65) Prior Publication Data

US 2012/0008192 A1 Jan. 12, 2012

(51) Int. Cl.
*G02B 5/00* (2006.01)

(52) U.S. Cl.
USPC .......................................... 359/350; 359/885

(58) Field of Classification Search .................. 359/350, 359/359, 885, 892
See application file for complete search history.

(56) References Cited

U.S. PATENT DOCUMENTS

| 5,238,738 | A  | * | 8/1993  | Miller ............................ 428/333 |
| 6,391,400 | B1 | * | 5/2002  | Russell et al. .................. 428/34 |
| 7,081,991 | B2 | * | 7/2006  | Jones et al. .................... 359/359 |
| 7,715,095 | B2 | * | 5/2010  | Carlson et al. ................. 359/350 |
| 2007/0030563 | A1 |   | 2/2007  | Zueger |
| 2010/0220389 | A1 | * | 9/2010  | Villuendas Yuste et al. .. 359/360 |
| 2010/0258752 | A1 | * | 10/2010 | Mochizuki et al. ........ 250/515.1 |

FOREIGN PATENT DOCUMENTS

JP 200599755 A 4/2005

* cited by examiner

*Primary Examiner* — Frank Font
(74) *Attorney, Agent, or Firm* — Barlow, Josephs & Holmes, Ltd.

(57) ABSTRACT

An optical filter composite is provided having effective filtering of infrared emissions, such as solar or laser emissions, while providing very high visible light transmission, preserving the ability to differentiate and recognize colors and providing a pleasing overall color as compared to the prior art. The present invention provides for filters that are formed by lamination, infusion and/or coating processes using filtering assemblies having a neutral color with high visible light transmission while also producing high levels of filtration in the infrared and near infrared range to provide effective protection against harmful emissions in these ranges while also producing a filter that has a color that is more pleasing and desirable to the wearer.

22 Claims, 2 Drawing Sheets

IR FILTERS WITH HIGH VLT AND NEUTRAL COLOR

BACKGROUND OF THE INVENTION

The present invention relates generally to optical safety filters. More specifically, the present invention relates to optical safety filters that provide infrared and near-infrared filtration that can be applied in a variety of environments for protection in the form of solar radiation shields, heat shields and laser emission filters.

It is well known that a number of different applications require effective shielding against exposure to infrared and near infrared radiation emissions. To protect against the damage caused and heat gain attributed to infrared and near infrared emissions in the context of solar radiation, various prior art films have been applied to structural and/or automotive windows to reduce glare and to provide solar screening. For example, plastic films that are dyed or coated to provide desired optical properties are applied to the interior surfaces of such windows. Typically such a film that provides effective solar screening is one that, through energy absorbtion, has a low transmission in both the visible range (400 to 700 nm) and the infrared and near infrared range (700 to 3000 nm). However, these prior art dyed films are soft and susceptible to damage, scratching and peeling. Further, the dyes in the films often fade with solar exposure. Also, when the films are colored with multiple dyes, the resulting film is a muddy green color wherein the dyes often fade at different rates, causing unwanted color changes over the life of the film.

Other known infrared and near infrared filteration windows are fabricated using vacuum-deposited grey metals, such as stainless steel, inconel, monel, chrome or nichrome alloys. The deposited grey metal films offer about the same degrees of transmission in the visible and near infrared portions of the solar spectrum. As a result, the grey metal films are an improvement over dyed films with regard to solar control. The grey metal films are relatively stable when exposed to light, oxygen and moisture, and in those cases in which the transmission of the coatings increases due to oxidation, color changes are generally not detectable. After application to clear float glass, grey metals block light transmission by approximately equal amounts of solar reflection and solar absorption.

Other vacuum-deposited metal layers such as silver, gold, aluminum and copper control solar radiation primarily by reflection. Because of the high reflection in the visible spectrum (i.e., high $R_{VIS}$), films having these vacuum-deposited layers are useful in only a limited number of applications. A modest degree of selectivity of transmission in the visible spectrum over transmission in the near infrared spectrum is afforded by certain reflective materials, such as copper and silver. A particular difficulty in this application is that the cost of materials and the finished filter tend to be very expensive.

In other contexts, there are a number of commercial and military fields where there is a growing awareness that certain wavelengths of energy emissions are harmful to the eye. Generally, such energy emissions, in the form of a laser emission, are grouped at or near the infrared range corresponding to approximately 750-3000 nm. For example, energy emitted from a laser operating in this wavelength range can cause both temporary and permanent blindness and can be disorienting to those people that have been exposed. The adverse effects of energy emissions having a wavelength within this wavelength region are only recently beginning to be fully recognized as applications that utilize such energy emissions are more frequently employed. For example, there are a number of optical communication protocols that utilize lasers tuned to these wavelengths for the transmission of data as well as a number of military applications that employ infra-red and near infra-red laser energy emissions at these wavelengths in connection with the sighting of weapons and target acquisition. Further, many industries are beginning to employ laser cutting systems that employ infrared/near-infrared lasers. As the environments in which the use of such energy emissions increases, the potential for accidental exposure to such emissions also greatly increases.

In the past, to avoid accidental exposure to infra-red laser emissions, people have attempted to protect their eyes through the use of currently available optical filters that contain both narrow and broad band absorbers that block light over a wide range of wavelengths resulting in an overly dark filter that screens out the potential for exposure to harmful emission levels. In this regard, however, the broadband filters only reduced the magnitude of the exposure rather than screening out the harmful wavelengths of energy. As a result, with only a few exceptions, such filters have generally been directed toward the reduction in intensity of the light transmitted, rather than to the filtering of any particular wavelength or group of wavelengths.

The problem with such a prior art approach is that the nonselective reduction in overall light transitivity generally impacts the visual acuity of the wearer making the use of such filtering difficult if not impossible to implement due to the severe limitations imposed on the visibility of the wearer. One key area that further limits the wearability of such generalized filters is traffic signal recognition. To meet the standards required for use as sunglasses, the wearer must be able to differentiate between red and green traffic signals. Often broad filters directed at screening the above laser energy emissions also result in severely limiting the wearer's ability to differentiate between red and green objects making traffic identification difficult if not impossible.

Another prior art approach involved in laser filtering related to the use of specialty lenses. The difficulty with such lenses is that they typically have a limited range of properties, because they are made of glass or high impact polymers such as polycarbonate, thereby requiring that the additives used to modify the transmissivity must be compatible with the high temperatures required in making the glass or molding of the polymer material. For example, in forming a polycarbonate lens at molding temperatures of 550° F. the dyes implemented must have a very high thermal stability and must be added at relatively high concentrations to protect against their breakdown during the molding process.

As a result, the range of substances that are available that are both compatible with the high molding temperatures and capable of imparting the desired filtering properties is very narrow and generally does not provide the versatility typically encountered with organic dyestuffs that are normally utilized for narrow wavelength filtering. Such dyes are generally fully within the green range as the neutral color dyes break down at the temperature ranges discussed herein. The resulting filter that provides the desired level of protection typically employs a high quantity of greenish dye that produces a very undesirable muddy green color. Not only is this undesirable from a commercial standpoint, it further encounters the problem that the filter does not allow the wearer to differentiate well between reds and greens. Finally, such a lens has a low light transmissivity on the order of 24% because the overall quantity of dye required in making the lens is so high.

A similar issue arises when employing a coating method for providing infrared/near infrared filtration. The problem that arises with coatings is that the coating application is generally thin, on the order of 1-5 microns, making it very difficult to get sufficient filtering protection. When using the coating method to get to the desired level of protection, the dye concentration must be high creating a coating material that is very dark. These dark coatings in turn greatly reduce the VLT of the filter. In addition, most of IR/NIR dyes have very limited solubility in polar coatings for desired concentration to obtain protection.

As a result there is a need for an optical filter that blocks infrared/near infrared energy emissions, such as laser energy emissions, while preserving the wearer's ability to differentiate between reds and greens. There is a further need for an optical filter that includes neutral colored filtration dyes that filter laser energy emissions while having a pleasing overall color and while also having a high VLT on the order of 65%. There is still a further need for an optical filter that meets the requirements set forth to create an effective heat shield that blocks infrared/near infrared energy emissions while also maintaining the desired visible light transmission characteristics.

BRIEF SUMMARY OF THE INVENTION

In this regard, the present invention provides for an optical filter assembly that provides effective filtering of infrared emissions in the context of heat shields, solar filters and laser emission filters, while preserving the ability to differentiate and recognize colors and providing a pleasing overall color as compared to the prior art. The present invention is directed generally to a selective optical filter that employs laminated filtering materials during the forming process used to create the filter. The laminated filtering materials in the present filter assemblies have a neutral color with high visible light transmission while also producing high levels of filtration in the infrared and near infrared range to provide effective protection against harmful emissions in these ranges while also producing a filter that has a color that is more pleasing and desirable to the wearer. In other words, the optical filter of the present invention effectively reduces transmission of laser energy in the selected ranges while improving the overall color of the filter itself thereby making the filter more desirable to the user.

It is therefore an object of the present invention to provide a filtering panel that filters infrared and near infrared emissions such as laser energy emissions while also having a neutral color and high visible light transmission. It is a further object of the present invention to provide an optical filter that includes neutral colored filtering films that filter energy emissions to a non-hazardous level from infrared and near infrared lasers while also improving the overall color of the optical filter itself. These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying descriptive matter in which there is described several embodiments of the invention.

BRIEF DESCRIPTION OF THE DRAWINGS

In the drawings which illustrate the best mode presently contemplated for carrying out the present invention.

DETAILED DESCRIPTION OF THE INVENTION

The best mode for carrying out the present invention is illustrated herein in the context of an optical filter that preferably includes a filtering layer in the form of a coating, infusion layer or laminated filtering films that are incorporated into the filter panel in a novel fashion for filtering energy emissions in and about the wavelength ranges infrared and near infrared and more particularly in the range of infrared and near infrared laser emissions to improve the overall performance and aesthetic appeal of the optical filter. As was stated above, as applications that employ infrared and/or laser energy increase, the need to protect people against accidental exposure also greatly increases. For this reason, the present invention provides an optical filter capable of filtering energy emissions in the wavelength ranges that infrared and near infrared energy emissions while also providing a lens that is color balanced in a manner that preserves the ability to distinguish colors and has a more pleasing overall color as compared to the prior art.

In the context of this invention, various optical terms are used to describe the optical filter. To facilitate the understanding of the invention, these terms are initially defined as follows:

Lens: an ophthalmic lens that provides refractive correction or a lens that provides no refractive correction also known as a "plano lens".

Visible light spectrum: energy emissions having a wavelength of between approximately 400 nm and 780 nm.

Visible light transmission (VLT): the percentage of light in the visible spectrum range that the filter of the present invention allows to pass through to the eyes of the user.

Blocking: a measure of the percentage of light that is either reflected by the surface or surface coatings or absorbed by the dye or plastic of the lens.

Substantially blocking: the point at which the filter of the present invention blocks over 99 percent of the incident radiation or transmits less than one-percent (1.0%) of the incident radiation at each and every wavelength within the defined range.

Infrared and near infrared: energy emissions having a wavelength on the order of between approximately 750 nm and 3000 nm.

Proximate: in the context of the present invention the term proximate to the surface of the filter blank is intended to mean the general location of the filtering material relative to the surface of the filtering blank. More particularly, the term proximate is meant to include a region at or about the filter blank extending both outwardly from the surface as well as at least partially into the thickness of the filter blank including filtering arrangements wherein the filtering material is coated on the filter blank, infused into the filter blank and laminated on or between a pair of filter blanks.

Figure 1:
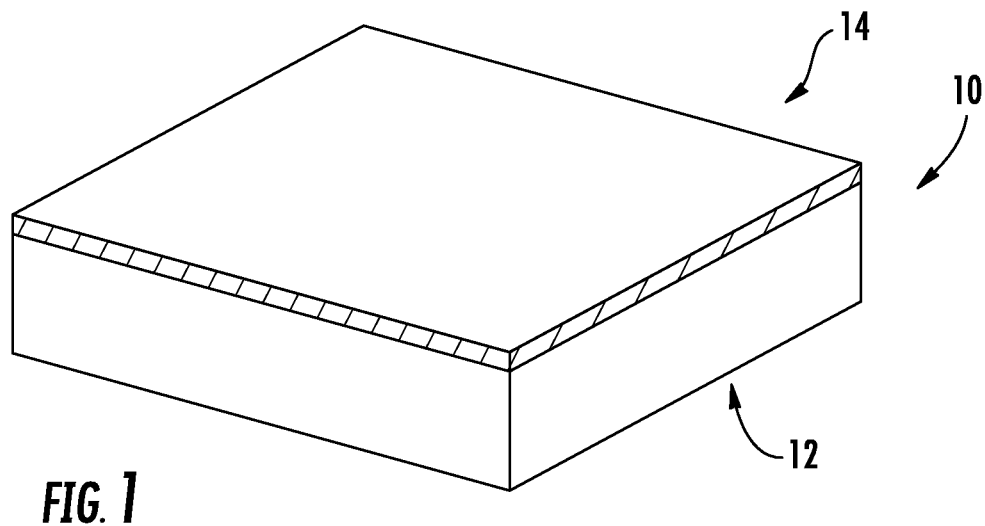
FIG. 1 is cross-sectional view of a general embodiment of the filter panel of the present invention.

Most generally, as depicted at FIG. 1, the present invention is directed to an optical filter 10 that includes at least one transparent filter blank 12 and a filtering layer 14 that is layer proximate a surface of the filter blank 12 wherein the filtering layer 14 blocks or substantially blocks energy emissions corresponding to a wavelength range of between approximately 750-3000 nm. It is preferred, but not required that the filter layer 14 be of a neutral color. The optical filter is designed to be utilized in any environment where the potential for exposure to high levels of infrared and near infrared energy such as heat, solar or laser emissions exists. The optical filter of the present invention is preferably formed from a transparent polymer matrix material that is suitable for making ophthalmic quality lenses. It is also preferred that the polymer base matrix material be selected from the group consisting of: polycarbonate, nylon and acrylic. It is further preferred that the particular polymer selected be well suited to the application in which the finished optical filter will be employed. For example, lens blanks as are typically formed using a polycarbonate while windows are formed using acrylic. In practical application, the filter blank is formed for further use as lens blanks, lenses for eyewear, windows and filtering plates.

In all cases, despite the application, the optical filter of the present invention provides an effective filter barrier to the targeted infrared/near infrared energy emissions thereby preventing the damage caused by such energy emissions while providing improved visible light transmission and color recognition. The filtering assemblies of the present invention have characteristics that allow the filter panel to transmit a greater amount of the of the visible light spectrum adjacent the filtering ranges while blocking more than 99% of all energy emissions having wavelengths that fall in the of relevant hazardous infrared/near infrared wavelengths ranges.

As stated above, an optical filter is provided that is directed at filtering the relevant wavelengths. The optical filter can be seen to have a filtering blank and a filtering layer that screens or substantially block all of the energy associated with emissions in the infrared and near infrared range of approximately 750-3000 nm. As was stated above however, such a filtering characteristic in the prior art has had two distinct drawbacks in that it produces an optical filter having an unattractive color and a low visible light transmission, while also greatly impairing the wearer's ability to distinguish colors such as those in traffic signals. To overcome this problem, the present invention employs a filtering layer that provides selective screening of infrared and near infrared energy emissions and produces color-balancing effects. The novel incorporation of the filtering layer into the unique filter panel constructions of the present invention has two effects. It provides protection from hazardous infrared/near infrared while also producing a filter panel that has sufficient impact resistance so as to meet the requirements of safety glass assemblies.

Figure 2:
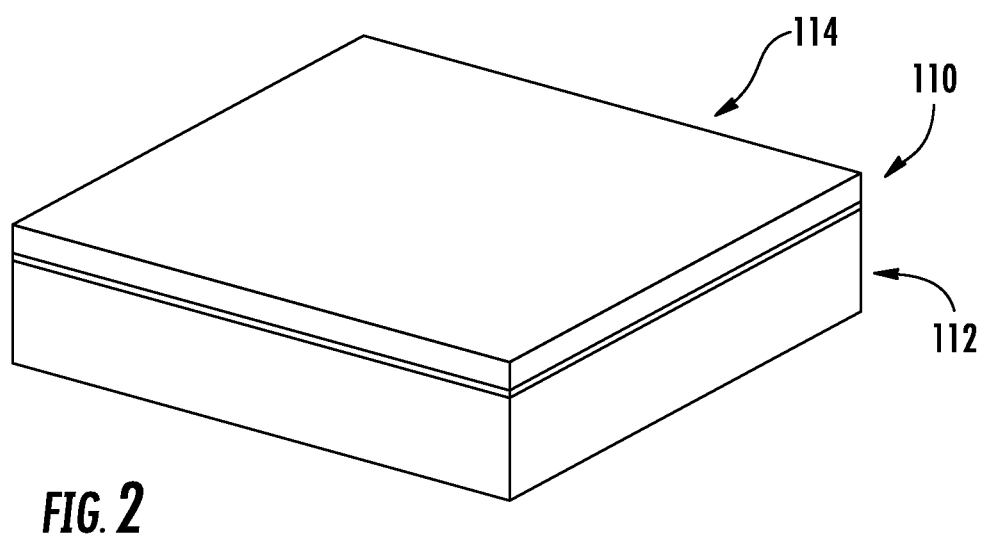
FIG. 2 is cross sectional view of a first laminated embodiment of the filter panel of the present invention.

In forming the optical filter of the present invention, three different methods or combinations thereof may be employed. As shown at FIG. 2, the first method involves the formation of the filter panel 110 using lamination technology. As was stated above the formation temperatures of polycarbonate materials is generally detrimental to the dyes traditionally used in infrared and near infrared applications and as a result only muddy green dyes have been available for use in polycarbonate filters. In the present invention the filter is formed as a composite laminated structure having at least one layer of polycarbonate 112 with a film 114 laminated proximate a surface thereof. In the context of YAG laser protective windows a filter panel is formed wherein a YAG filtering film is adhered or laminated to or between a panel of clear polymer substrate. This provides a great reduction in cost over such prior art assemblies wherein a YAG filtering window is formed by dying the polymer substrate itself. In this context a film is formed with the YAG filtering dye mixed into the film substrate and the film substrate is then laminated to the window panel substrate.

Figure 3:
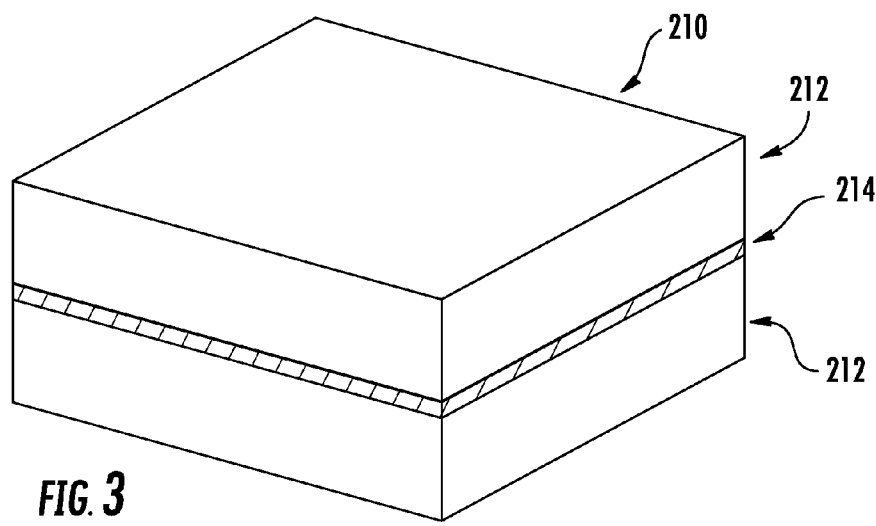
FIG. 3 is cross sectional view of a second laminated embodiment of the filter panel of the present invention.

In an alternate context wherein color rendition and visible light transmission is of high concern, such as for observation windows for medical laser systems, the filtering layer is preferably of a neutral color. More preferably, the filtering layer itself is constructed to include a plurality of layers of polymer wherein the adjacent layers within the film are polarized or include varying indicies of refraction that serve to block or reflect energy emissions at a certain wavelength or range of wavelengths within the infrared/near infrared range. In this context a filtering range of between 750-3000 nm can be achieved with a visible light transmission on the order of 55-60%. Still further, the composition, as shown at FIG. 3 may include two layers of polycarbonate filter blanks 212 with the filtering film 214 incorporated therebetween. Since the filtering film 214 can be incorporated without concern for its stability during the forming process a neutral colored filter film can be used that provides sufficient optical density in the desired filtering wavelengths. The resulting filter panel 210 therefore is a laminated composite that can then be shaped as necessary to create window panels and other filter blanks. Further, for applications that require curved filters, such as ophthalmic lenses, the composite material can be compression molded as necessary to form safety glass lenses and the like.

Figure 4:
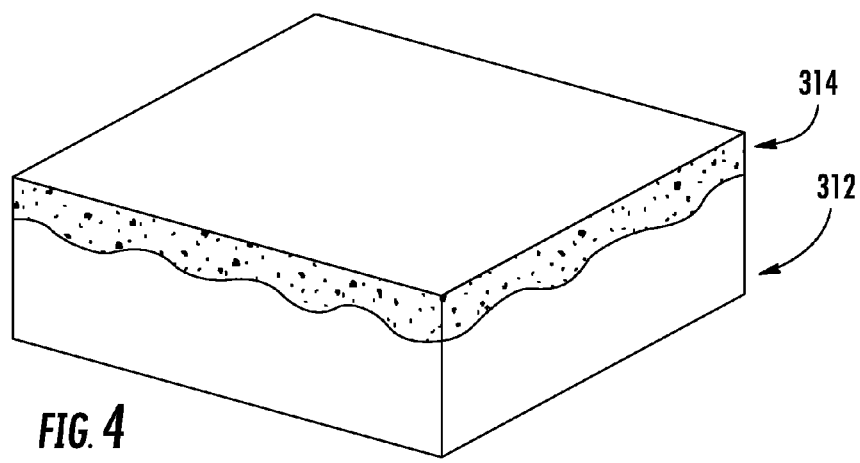
FIG. 4 is cross sectional view of an infused embodiment of the filter panel of the present invention.

The second and third methods are related to optical filters that are first formed and then treated to create the desired filtering effect. In these filter panels, polymer molding feedstock in the form of polymer pellets is provided that is then introduced into the feed hopper of an extrusion-molding machine wherein the mixture is melted and homogenized in the barrel of the molding machine. The molten material is then extruded either through an extrusion die or into a mold to form the optical filter blank. The optical filter blank is then further processed in one method using infusion technology. As seen at FIG. 4, a filter blank 312 is infused with a dye 314 that incorporates water-soluble infrared and near infrared dyes. This process forms a filtering layer 314 within the thickness of the filtering blank 312 proximate the filter surface. When the water based dyes are infused into the filter blanks after their formation, neutral colored dyes can be used because there is not a concern that the dye will deteriorate at the temperatures related to the typical formation process of a polycarbonate filter. In employing this optical filter composition, lower concentrations of dyes can be incorporated into the surface of the filter in a manner that provides higher optical densities to protect the user against infrared and near infrared emissions with a high VLT on the order of 65% and a neutral color that is far more desirable than the prior art green filters.

Figure 5:
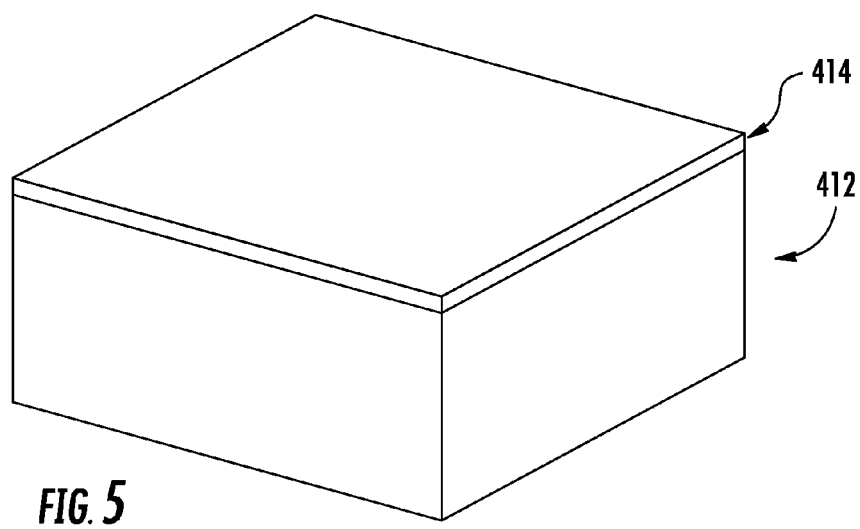
FIG. 5 is cross sectional view of a coated embodiment of the filter panel of the present invention.

In a third embodiment as shown at FIG. 5, the filtering layer 414 is formed as a coating on the surface of the filter blank 412. A filter blank 412 is coated 414 with an infrared and near infrared dye that may include water-based dyes, solvent based dyes, resin based dyes, UV curable dyes, thermal curable dyes and combinations thereof. This process forms a filtering layer on the surface of the filtering blank proximate the filter surface. When the water based dyes are coated onto the filter blanks after their formation, neutral colored dyes can be used because there is not a concern that the dye will deteriorate at the temperatures related to the typical formation process of a polycarbonate filter. In employing this optical filter composition, lower concentrations of dyes can be incorporated into the surface of the filter in a manner that provides higher optical densities to protect the user against infrared and near infrared emissions with a high VLT on the order of 65% and a neutral color that is far more desirable than the prior art green filters.

In one application for the lenses of the present invention protective eyewear is provided that employs the technologies disclosed herein to create a lens that provides filtering at an optical density (OD) of 5 at between about 830 nm and 2940 nm and an OD on the order of 3-4 at between 2100 nm and 2940 nm. The lens also includes a VLT of greater than 55%.

In another application night vision lenses are formed to have an OD of 2 at about 750 nm to 950 nm and a VLT of 70% or greater.

In the context of heat shields while VLT levels, Maximum IR transmittance from 780 nm to 1400 nm, and Maximum IR transmittance from 780 nm to 2000 nm must be within the ranges in the specifications that have been established as set forth in Table 1 for the requirements associated with varying heat-shielding levels.

TABLE 1

| EN171 IR filter Requirements | Luminous transmittance tv | | Maxium mean specctral transmittance in the IR | |
|---|---|---|---|---|
| | | | 780 nm to 1400 nm % | 780 nm to 2000 nm % |
| scale number | maximum % | minimum % | $t_A$ | $t_M$ |
| 4-1.2 | 100 | 74.4 | 5.5 | 52.9 |
| 4-2 | 43.2 | 29.1 | 3.6 | 37.9 |
| 4-4 | 8.5 | 3.2 | 1.2 | 15.9 |
| 4-6 | 1.2 | 0.44 | 0.43 | 7.1 |
| 4-7 | 0.44 | 0.16 | 0.23 | 4.4 |
| 4-8 | 0.16 | 0.061 | 0.14 | 2.9 |
| 4-9 | 0.061 | 0.023 | 0.075 | 1.8 |
| 4-10 | 0.023 | 0.0085 | 0.050 | 1.3 |

In the prior art these heat shields, as stated above were typically formed using metal deposition technologies. In contrast, the present invention is employing technologies that create such heatshields using laminated polymer and film based IR filters as can be seen below in Table 2.

TABLE 2

| Sample ID | Luminous Transmittance (ANSIZ871-2003) | 780 nm to 1400 nm % $t_A$ | 780 nm to 2000 nm % $t_M$ | potential applications ns IR filters |
|---|---|---|---|---|
| Huper New Film received on Mar. 2, 2010 + 3M DIS film | 64.97% | 2.11% | 1.6 | scale number 4-2 with pre-tinted PC |
| Huper New Film received on Mar. 2, 2010 + 3M 70 film | 53.61% | 2.10% | 1.36 | |
| Huper Select Drei two sheets sandwiched in two 20 mil PC sheets | 10.09% | 0.78% | 0.41% | scale number 4-3 |
| 3M DBEF-D400 0 degree film + Huper select drei sandwiched in two 20 mil PC sheets (0 degree) (lauper side) | 3.18% | 1.17% | 0.69% | scale number 4-4 |
| 3M DBEF-D400 0 degree film + Huper select drei sandwiched in two 20 mil PC sheets (0 degree) (lauper side) vertical | 3.72% | 3.18% | 0.70% | |
| 3M BEF-RP0 degree film + Huper select drei sandwiched in two 20 mil PC sheets | 1.75% | 0.46% | 0.27% | scale number 4-5 |
| 3M BEFII 90/50 film + Huper select drei sandwiched in two 20 mil PC sheets (0 degree) (BEFII side) vertical | 1.23% | 0.21% | 0.12% | |
| 3M BEF-RP0 degree film + 3MDIS sandwiched in two 20 mil PC sheets | 0.53% | 0.38% | 0.61% | scale number 4-6 |
| 3M BEFII 90/50 film + Green laser sandwiched in two 20 mil PC sheets (0 degree) (BEFII side) vertical | 0.46% | 0.19% | 0.32% | |
| 3M BEFII 90/50 film + Huper select drei sandwiched in two 20 mil PC sheets (0 degree) (BEFII side) | 0.53% | 0.09% | 0.06% | |
| 3M BEFII 90/50 film + 3M DIS sandwiched in two 20 mil PC sheets (0 degree) (BEFII side) | 0.67% | 0.28% | 0.39% | |
| 3M BEFII 90/50 film + 3M DIS sandwiched in two 20 mil PC sheets (0 degree) (BEFII side) vertical | 0.47% | 0.24% | 0.33% | |
| 3M BEFII 90/50 film + Green laser sandwiched in two 20 mil PC sheets (0 degree) (BEFII side) | 0.31% | 0.16% | 0.27% | scale number 4-7 |
| 3M BEFII 90/50 film + 3M 40 sandwiched in two 20 mil PC sheets (0 degree) (BEFII side) | 0.19% | 0.07% | 0.05% | |
| 3M BEFII 90/50 film + 3M 40 sandwiched in two 20 mil PC sheets (0 degree) (BEFII side) vertical | 0.25% | 0.09% | 0.06% | |
| 3M DBEF D-400 0 degree film + BEFII90/50 sandwiched in two 20 mil PC sheets (0 degree) vertical | 0.1970% | 0.2238% | 0.2116% | |
| 3M BEFII 90/50 film + BEF-RP sandwiched in two 20 mil PC sheets (0 degree) | 0.0067% | 0.0094% | 0.0114% | almost scale number 4-10 |
| 3M BEFII 90/50 film + BEF-RP sandwiched in two 20 mil PC sheets (0 degree) vertical | 0.0078% | 0.0108% | 0.0114% | |

The ability to mold the optical filter in accordance with the teachings of the present invention provides a great advantage over prior art filters having the same filtering characteristics in that the prior art filters had to be formed and coated. Since the present invention optical filters can be molded, a large savings in manufacturing time and cost is realized.

It can therefore be seen that the present invention provides a novel optical filter having the ability to substantially block energy emissions in the infrared and near infrared range, while providing a very high VLT value on the order of 65% and a greatly improved neutral color as was previously unavailable in the prior art. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. An optical safety filter for protecting against exposure to infrared radiation having a wavelength ranging from approximately 750 nm to approximately 3000 nm, said optical safety filter comprising:
   at least one transparent filter blank formed from a transparent polymer base matrix material; and
   a filtering layer configured and arranged proximate to a surface of said filter blank,
   said filtering layer including a neutral colored dye effective for substantially blocking infrared radiation having a wavelength ranging from approximately 750 nm to approximately 3000 nm,
   said optical filter having a visible light transmission of greater than 49%.

2. The optical filter of claim 1, wherein said polymer base matrix material is selected from the group consisting of: polycarbonate, nylon and acrylic.

3. The optical filter of claim 1, wherein said optical filter is selected from the group consisting of: lens blanks, lenses for eyewear, windows and filtering plates.

4. The optical filter of claim 1, wherein said filtering layer is laminated to the surface of the filter blank.

5. The optical filter of claim 4, further comprising:
   a second transparent filter blank, said filtering layer being laminated between said filter blanks.

6. The optical filter of claim 1, wherein said filtering layer is a coating applied to the surface of the filter blank.

7. The optical filter of claim 6, wherein the coating is selected from the group consisting of: water based, solvent based, resin based, UV curable, thermal curable and combinations thereof.

8. The optical filter of claim 6, wherein the filtering layer includes a dye therein that substantially blocks emissions corresponding to a wavelength range of between approximately 750-3000 nm.

9. The optical filter of claim 1, wherein said filtering layer is a portion of an overall thickness of the filter blank into which a dye is infused.

10. The optical filter of claim 9, wherein the infused dye is water based.

11. An optical safety filter for protecting against exposure to infra-red radiation having a wavelength ranging from approximately 750 nm to approximately 3000 nm, said optical safety filter comprising:
    at least one transparent filter blank formed from a transparent polymer base matrix material; and
    a filtering layer configured and arranged proximate to a surface of said filter blank,
    said filtering layer comprising a plurality of polymer layers wherein adjacent layers cooperate to substantially block infra-red radiation having a wavelength ranging from approximately 750 nm to approximately 3000 nm,
    said optical filter having a visible light transmission of greater than 49%.

12. The optical safety filter of claim 11, wherein said polymer base matrix material is selected from the group consisting of: polycarbonate, nylon and acrylic.

13. The optical safety filter of claim 11, wherein said optical filter is selected from the group consisting of: lens blanks, lenses for eyewear, windows and filtering plates.

14. The optical safety filter of claim 11, wherein said filtering layer is laminated to the surface of the filter blank.

15. The optical safety filter of claim 11, wherein said filtering layer comprises a plurality of polymer layers which are polarized and cooperatively oriented so as to substantially block said infrared radiation.

16. The optical safety filter of claim 12, wherein said filtering layer comprises a plurality of polymer layers which are polarized and cooperatively oriented so as to substantially block said infrared radiation.

17. The optical safety filter of claim 13, wherein said filtering layer comprises a plurality of polymer layers which are polarized and cooperatively oriented so as to substantially block said infrared radiation.

18. The optical safety filter of claim 14, wherein said filtering layer comprises a plurality of polymer layers which are polarized and cooperatively oriented so as to substantially block said infrared radiation.

19. The optical safety filter of claim 11, wherein said filtering layer comprises a plurality of polymer layers each having varying indices of refraction so as to substantially block said infrared radiation.

20. The optical safety filter of claim 12, wherein said filtering layer comprises a plurality of polymer layers each having varying indices of refraction so as to substantially block said infrared radiation.

21. The optical safety filter of claim 13, wherein said filtering layer comprises a plurality of polymer layers each having varying indices of refraction so as to substantially block said infrared radiation.

22. The optical safety filter of claim 14, wherein said filtering layer comprises a plurality of polymer layers each having varying indices of refraction so as to substantially block said infrared radiation.

\* \* \* \* \*